United States Patent [19]
Matsui

[11] Patent Number: 5,926,659
[45] Date of Patent: Jul. 20, 1999

[54] BRACKET FOR MOUNTING A THERMAL-BASED ELECTRIC CURRENT CUTOFF DEVICE WITHIN A PIECE OF ELECTRONIC EQUIPMENT

[75] Inventor: Hideki Matsui, Fujisawa, Japan

[73] Assignee: Nikon Corporation, Tokyo, Japan

[21] Appl. No.: 09/038,106

[22] Filed: Mar. 11, 1998

[30] Foreign Application Priority Data

Mar. 11, 1997 [JP] Japan .................................... 9-056341

[51] Int. Cl.⁶ .............................. G03B 7/26; H02H 5/04
[52] U.S. Cl. ........................... 396/206; 396/539; 361/103
[58] Field of Search .................................. 396/205, 206, 396/539; 361/103, 105, 104, 106

[56] References Cited

U.S. PATENT DOCUMENTS

| | | | |
|---|---|---|---|
| 3,742,832 | 7/1973 | Stoneham et al. | 396/539 |
| 4,074,170 | 2/1978 | Orban | 396/205 |
| 5,615,071 | 3/1997 | Higashikata et al. | 361/103 X |

*Primary Examiner*—W. B. Perkey
*Attorney, Agent, or Firm*—Erik B. Cherdak & Associates, LLC

[57] ABSTRACT

A bracket for mounting a thermal cutoff device within an electronic device having an electronic component. The bracket includes, but is not limited to, a fastener for fastening the bracket within the electronic device, and a holder integrally formed with the fastener. The holder is configured to releasably hold a thermal cutoff device. The thermal cutoff device is configured to operate based on heat generated by the electronic component. The heat is transmitted to the thermal cutoff device via the fastener and the holder.

32 Claims, 7 Drawing Sheets

BRACKET FOR MOUNTING A THERMAL-BASED ELECTRIC CURRENT CUTOFF DEVICE WITHIN A PIECE OF ELECTRONIC EQUIPMENT

BACKGROUND OF THE INVENTION

1. Field of the Invention

The present invention relates to thermal-based electric current cutoff devices and, more particularly, to brackets which are used for mounting the same within electrical devices such as within camera flash units.

2. Description of the Related Art

Thermal-based electric current thermal cutoff devices (hereinafter "thermal cutoff devices") are well known. Such devices are used to control and stop the unexpected and uncontrolled flow of electric current within electronic equipment such as within cameras and camera flash units. In electronic devices that utilize battery-based power supplies, for example, power failures due to short circuits, etc., often result. Such power failures can occur due to broken wires and the like which are caused by movement and impacts realized by electronic devices. When a short circuit occurs, other anomalies can occur within such devices. For example, if a battery unit becomes short-circuited, relatively large "over-current" flows (e.g., 15–30 amperes) can result.

When an over-current situation occurs, the temperature of electronic components within an electrical device can increase rapidly thereby possibly causing damage to the electrical components themselves and to other structures (e.g., plastic and other casing members that support and house electrical components). In some cases, an over-current situation can cause fire if enough current is allowed to flow in an uncontrolled manner for an extended period of time.

Accordingly, to prevent such over-current situations from occurring and to minimize the damage that can result, many pieces of electronic equipment include thermal cutoff devices. Typically, such thermal cutoff devices are mounted on and often adhered to electronic components, such as power supply transformers, transistors, etc., which generate heat. In many cases, thermal cutoff devices are used to protect not only the components to which they are adhered and mounted, but also to protect surrounding components such as enclosures and printed circuit boards, etc.

Figure 1:
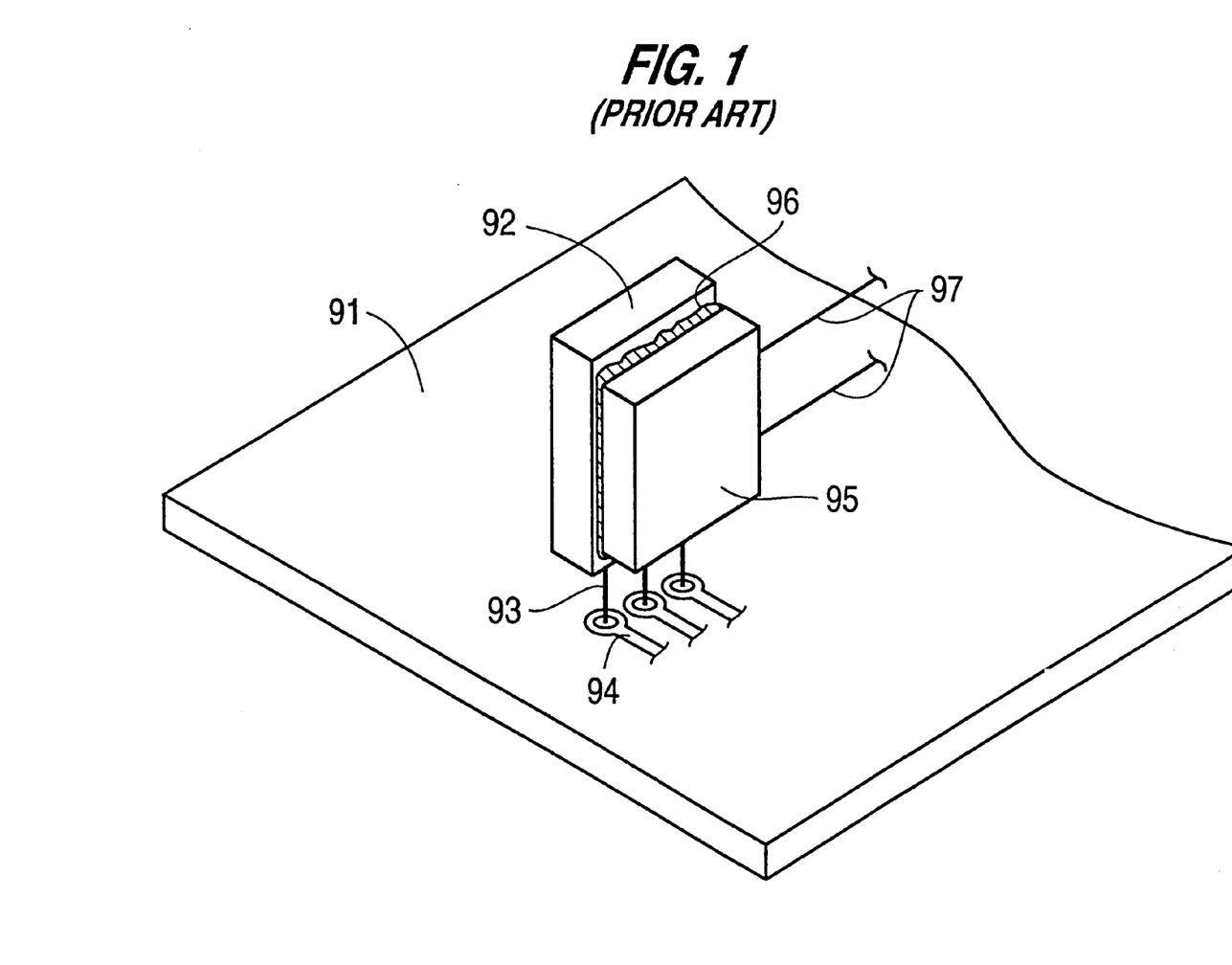
FIG. 1 is an oblique diagram of a thermal cutoff device mounting arrangement according to the prior art (as described above)

A typical thermal cutoff device arrangement is shown in FIG. 1 which is attached hereto. In FIG. 1, an electronic component 92 is mounted on a printed circuit board 91. Component 92 is connected to printed circuit board 91 in a conventional way via connecting lead wires 93 which are connected to corresponding conductive patterns 94. A thermal cutoff device 95 is interposed in a current path via terminals 97. Thermal cutoff device 95 is mounted on component 92 via an adhesive 96 such as a glue. Accordingly, when an over-current situation occurs in the circuit (e.g., as a result of a short circuit, etc.), the heat generated by component 92 is transmitted to thermal cutoff device 95 through the adhesive 96. In turn, thermal cutoff device 95 will terminate current flow within the circuit corresponding to component 92.

Although adhesives are widely used to secure thermal cutoff devices to electronic components, several problems are realized. For example, thermal cutoff devices often are adhered to components like component 92 one at a time and, often, by hand. Accordingly, establishing an adhesive coating thickness that is uniform across a production volume of electronic devices is difficult, if not impossible, to achieve. As such, the particular mounting characteristics (e.g., location, relative gap between a thermal cutoff device and corresponding component, etc.) can vary significantly. Additionally, as adhesive 96 often acts as a heat insulating member, the proportion of heat transmission to thermal cutoff device 95 can also differ. And, of course, as adhesive member 96 likely will vary in composition in the context a large product manufacturing run, so too will the heat transmission characteristics of adhesive member 96. Accordingly, when thermal cutoff devices of known characteristics are placed into operation in combination with adhesive mounting arrangements like those illustrated by FIG. 1, their timing and operation characteristics will differ.

Therefore, due to the differences in the thermal response of thermal cutoff devices like thermal cutoff device 95 when mounted with adhesives and the like, erroneous, unexpected operations can result in over-current situations. Furthermore, in the event that thermal cutoff device 95 needs be removed from component 92 (e.g., after a thermal cutoff device has been damaged, for example), it may become necessary to melt or remove adhesive 96. And, after thermal cutoff device 95 has been removed, it may become difficult, if not impossible, to mount another thermal cutoff device which exhibits the same temperature response characteristics as thermal cutoff device 95.

In addition to the problems associated with the prior art thermal cutoff device mounting arrangement described above, there is an obvious problem associated with adhering and mounting a large number of thermal cutoff devices within a given piece of electronic equipment. That is, the sheer number of thermal cutoff devices and the varying types of the same can become costly to install, especially if a relatively large number of thermal cutoff devices are needed in a particular piece of electronic equipment.

Thus, there exists a need to provide an improved device for mounting a thermal cutoff device within a piece of electronic equipment. Such a device should preferably take the form of a bracket. To be effective, such a bracket must allow consolidation of thermal cutoff functionality, allow effective and reliable use of thermal cutoff devices, and allow efficient replacement of thermal cutoff devices. And, to be viable in the relevant marketplace, such a bracket must be capable of being constructed and deployed in cost-effective ways.

SUMMARY OF THE INVENTION

In view of the preceding comments, it is a principal object of the present invention to solve the aforementioned problems associated reliably mounting thermal cutoff devices within electronic devices.

It is another object of the present invention to provide a bracket for mounting a thermal cutoff device that allows for reliable operation of the same without the use of adhesive type mounting arrangements.

It is still another object of the present invention to provide a bracket for releasably holding and maintaining a thermal cutoff device and which may be integrally formed with a battery contact member.

It is still another object of the present invention to provide a bracket that will allow for efficient insertion, removal, and replacement of thermal cutoff devices.

It is still another object of the present invention to provide a bracket device that will allow easy and effective control of thermal cutoff characteristics of a thermal cutoff device within a piece of electronic equipment.

It is a further object of the present invention to provide a bracket that will allow a thermal cutoff device to be centrally located near a power source in a piece of electronic equipment.

By achieving such objects, the present invention provides certain benefits not heretofore realized by prior art thermal cutoff device mounting schemes. For example, the present invention allows brackets to be manufactured according to uniform design parameters. And because such brackets do not require adhesives of varying thickness' to be used to mount thermal cutoff devices within pieces of electronic equipment, uniform and expected thermal cutoff properties can be realized. Moreover, when replacing or exchanging a thermal cutoff device, a previous thermal cutoff device may simply be pulled out from bracket through simple and efficient manual operation. There is no need to melt adhesives, clean components, etc. Accordingly, the amount of work necessary to insert new or replace broken thermal cutoff devices is reduced. Finally, by allowing heat detection and thermal cutoff functionality to occur centrally and at a power source instead of at multiple points within a circuit, for example, thermal cutoff functionality can be consolidated for electrical systems generally. Such consolidation of thermal cutoff functionality will result in fewer electronic components which, in turn, will result in greater design and manufacturing economies.

The aforementioned objects of the present invention are achieved to provide the above-described benefits by providing a bracket for mounting a thermal cutoff device within an electronic device that includes an electronic component. The bracket includes a fastener for fastening the bracket within the electronic device, and a holder that is integrally formed with the fastener. The holder is configured to releasably hold a thermal cutoff device. The thermal cutoff device is configured to operate based on heat generated by the electronic component. Heat is transmitted to the thermal cutoff device via the fastener and the holder.

According to another aspect of the present invention, provided is a bracket for mounting a thermal cutoff device within an electronic device having a battery compartment for maintaining a battery. The bracket includes a fastener for fastening the bracket to the battery compartment, and a holder that is integrally formed with the fastener. The holder is configured to releasably hold a thermal cutoff device. The thermal cutoff device is configured to operate based on heat generated by the battery. Heat is transmitted to the thermal cutoff device via the fastener and the holder.

According to another aspect of the present invention, provided is an electronic camera flash device that includes a flash system for providing flash illumination, a battery compartment for maintaining a battery, and a battery contact member for electrically coupling the battery to the flash system. The battery contact member includes a fastener for fastening the battery contact member to the battery compartment, and a holder that is integrally formed with the fastener. The holder is configured to releasably hold a thermal cutoff device. The thermal cutoff device is configured to operate based on heat generated by the battery as a result of the operation of the flash system. Heat is transmitted to the thermal cutoff device via the fastener and the holder.

According to a final aspect of the present invention, provided is a camera that includes a flash unit for providing flash illumination, a battery compartment for maintaining a battery, and a battery contact member for electrically coupling the battery to the flash system. The battery contact member includes a fastener for fastening the battery contact member to the battery compartment, and a holder that is integrally formed with the fastener. The holder is configured to releasably hold a thermal cutoff device. The thermal cutoff device is configured to operate based on heat generated by the battery as a result of the operation of the flash system. Heat is transmitted to the thermal cutoff device via the fastener and the holder.

BRIEF DESCRIPTION OF THE DRAWING FIGURES

The present invention is described below with reference to the following drawing figures, of which.

DETAILED DESCRIPTION OF THE PREFERRED EMBODIMENTS

The present invention is now discussed with referenced to the drawing figures that were briefly described above. A description of the STRUCTURAL ASPECTS of the present invention are followed by a discussion of corresponding OPERATIONAL ASPECTS. Unless otherwise specified, like parts and functions are referred to with like reference numerals

Structural Aspects of the Present Invention

Figure 2:
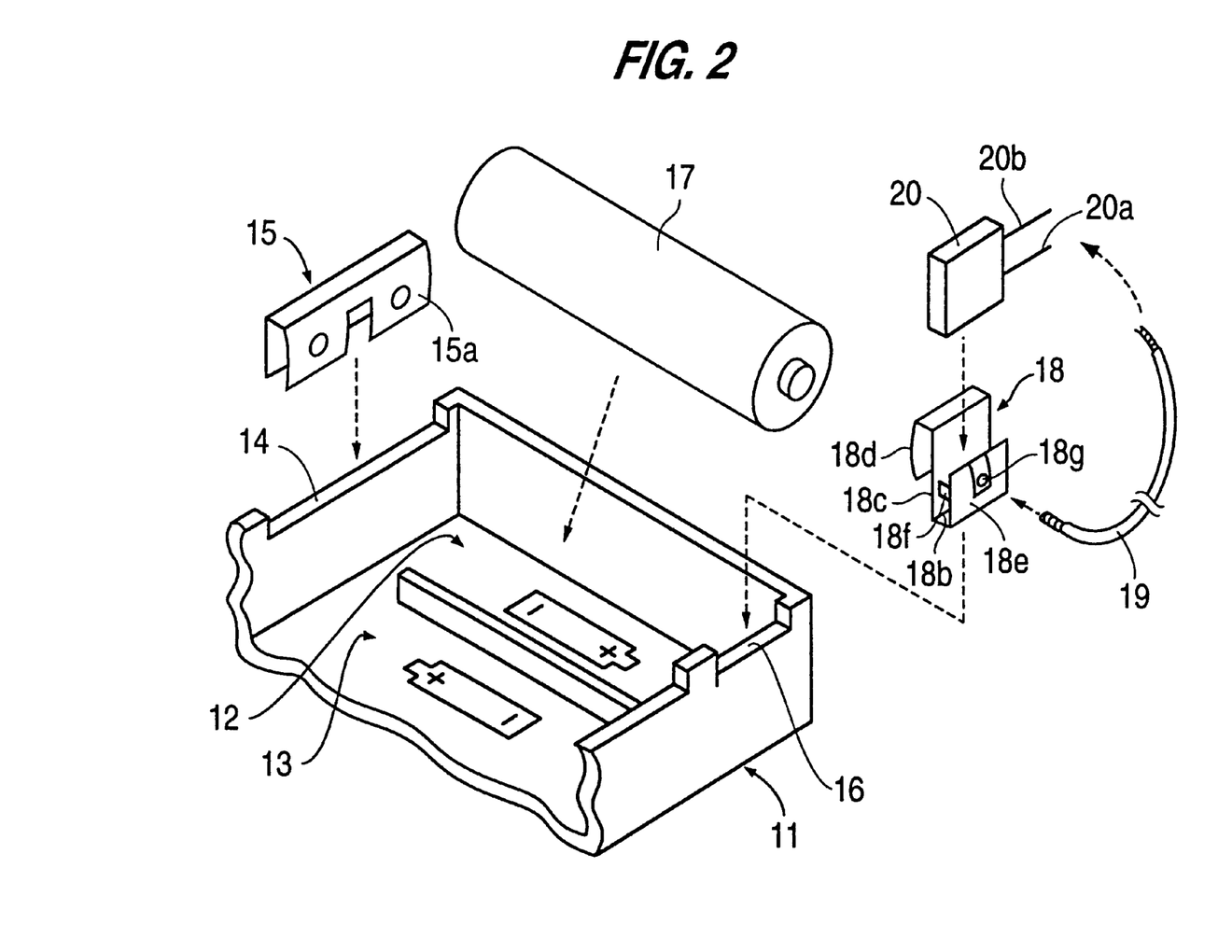
FIG. 2 is an oblique diagram of a power supply unit of a electronic camera flash unit which is equipped with a battery contact member/bracket for mounting a thermal cutoff device according to a preferred embodiment of the present invention.

Referring now to FIG. 2, depicted therein is an oblique diagram of a power supply unit of an electronic camera flash device which is equipped with a battery contact member having an integrally formed bracket for mounting a thermal-based electric current cutoff device (hereinafter "thermal cutoff device"). In particular, the power supply unit is equipped with a battery compartment 11 for housing one or more batteries, a battery contact member 15 which connects batteries in series, and a battery contact/bracket 18 which acts as a voltage output terminal and a holder for a thermal cutoff device.

In battery compartment 11, spaces 12 and 13 are adapted to receive and maintain batteries like battery 17. A notch portion 14 is disposed on a side wall of battery compartment 11. Battery contact member 15 is adapted to be mounted in notch portion 14. At the other end of battery compartment 11, a notch portion 16 is disposed which is adapted to receive battery contact/bracket 18. Battery contact member 15 is configured to connect (in series) two batteries housed in spaces 12 and 13. Battery contact/bracket 18 is configured to conduct voltage from battery 17.

Battery contact member 15 and battery contact/bracket 18 may be manufactured by bending phosphor bronze, ferrous materials, stainless steel and other spring-type materials to shape, and then nickel or tin plating the same. For example, battery contact member 15 may be constructed from flat metal structure that is bent into a "U" shape, and which is mounted on battery compartment 11 by installing an aperture section thereof downward on notch portion 14. Contact piece 15a is to be located toward the interior of battery compartment 11, and is adapted to come into contact with a negative electrode of battery 17, and a positive electrode of a battery which may be housed in space 13.

Figure 3:
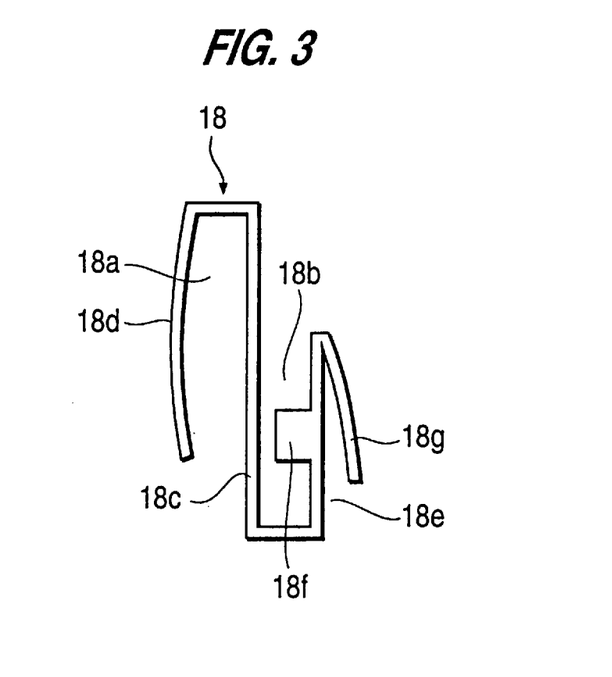
FIG. 3 is a side view of the battery contact member/bracket depicted in FIG. 2.

Referring now to FIG. 3, depicted therein is a side view of battery contact/bracket 18. In particular, battery contact/bracket 18 has been formed from a flat piece of metal which has both its ends bent in opposite directions to form an "S" shaped structure. Battery contact/bracket 18 is equipped with a hook portion 18a and an integrally formed bracket or holder section 18b. Hook portion 18a is a fastener structure that will allow battery contact/bracket to be mounted and fastened to other structures such as battery compartment 11. Holder section 18b is configured to releasably receive and hold a thermal cutoff device (not shown). In addition to hook portion 18a and holder section 18b, battery contact/bracket 18 includes a connecting piece 18c, a contact piece 18d, a support piece 18e, a terminal piece 18g, and a stop member 18f. These structures may be integrally formed and are further described below.

Figure 4:
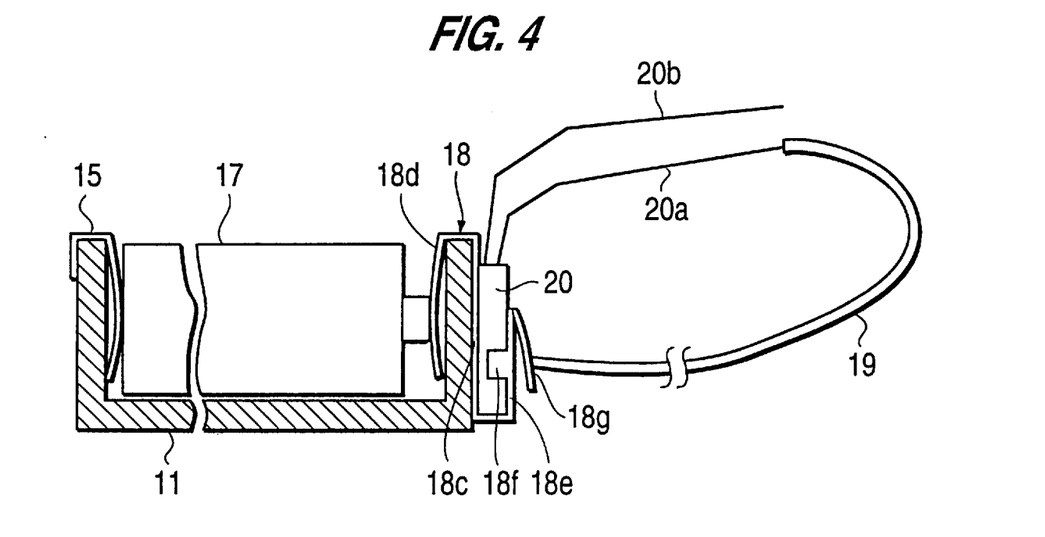
FIG. 4 is a cross-section view of the power supply unit depicted in FIG. 2.
Figure 11:
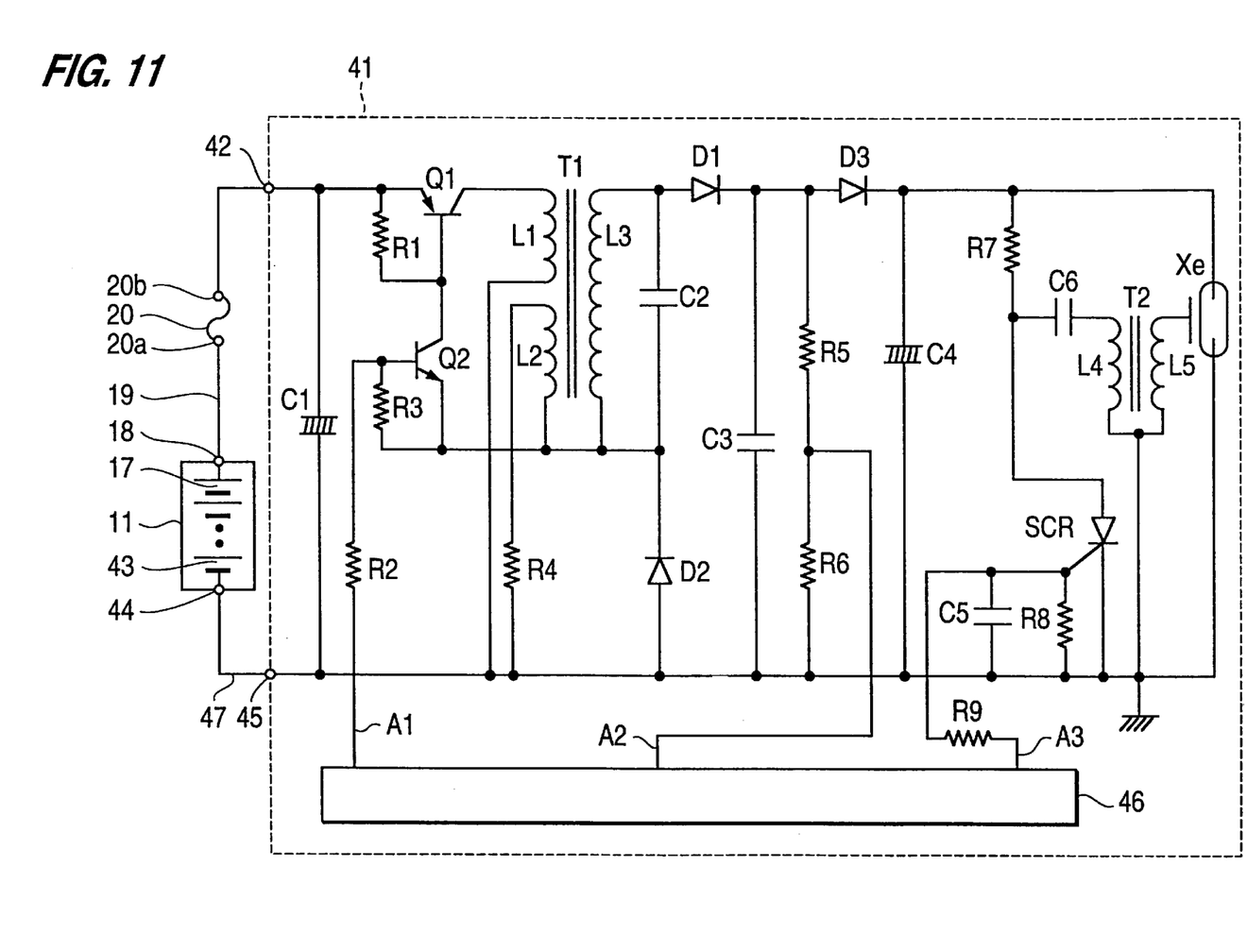
FIG. 11 is a circuit diagram of an electronic camera flash unit which includes a battery contact/bracket according to the present invention.

Referring now to FIG. 4, is a view of a cross-section the power supply unit depicted in FIG. 2. In particular, hook portion 18a of battery contact/bracket 18 has been mounted in notch portion 16 of a side wall of battery compartment 11. As such, contact piece 18d is in contact with the positive electrode of battery 17 which is housed in space 12 (FIG. 2). Accordingly, battery contact/bracket 18 is used to electrically couple a power source such as battery 17 to another electrical device (e.g., a flash circuit as shown in FIG. 11, etc.) and to hold a thermal cutoff device as described herein.

In addition to contacting battery 17, connecting piece 18c of battery contact/bracket is in contact with an outer surface of the side wall of battery compartment 11. As such, holder section 18b (FIG. 3) is positioned adjacent the side wall of battery compartment 11. A thermal cutoff device 20 is mounted and held in place by and between connecting piece 18c and support piece 18e. Thermal cutoff device 20 is prevented from moving through (or falling out of) holder section 18b by stop member 18f.

In FIG. 4, thermal cutoff device 20 has a rectangular, box-like shape. The present invention, however, is not so restricted. To the contrary a bracket or holder may be formed to suit the shape of any thermal cutoff device which may be used in a piece of electronic equipment (e.g., the present invention could accommodate and be adapted to support cylindrically shaped thermal cutoff devices, etc.). Moreover, in FIG. 4 the gap between support piece 18e and connecting piece 18c is about equal to the thickness of thermal cutoff device 20. And the length of support piece 18e and connecting piece 18c are about equal to the length of thermal cutoff device 20. As such, holder section 18b allows a thermal cutoff device to be sandwiched therein and held in place by the spring force of support piece 18e toward connecting piece 18c. As such, vibrations realized by battery contact/bracket 18 (and battery compartment 11) will not cause thermal cutoff device 20 to move and, possibly, become removed from holder section 18b.

In addition to the thermal cutoff device mounting characteristics of battery contact/bracket 18 as described above, it should also be noted that terminal piece 18g projects from the upper end of support piece 18e. Terminal piece 18g is intended to conduct a voltage from the battery 17 which may be used to power other components (e.g., like those shown in FIG. 11—discussed below) within a piece of electrical equipment such as within an electronic camera flash unit. As such, terminal piece 18g is placed in contact with a terminal 20a of thermal cutoff device 20 via a lead wire 19. Lead wire 19 may be soldered to terminal piece 18g. Such couplings of a thermal cutoff device will be immediately understood by those skilled in the art.

It should also be noted that heat generated by battery 17 (e.g., in the case of a short circuit, etc.), may be transmitted to thermal cutoff device 20 via battery contact/bracketed 18, such as by the structures making up hook portion 18a and holder portion 18b.

Figure 5:
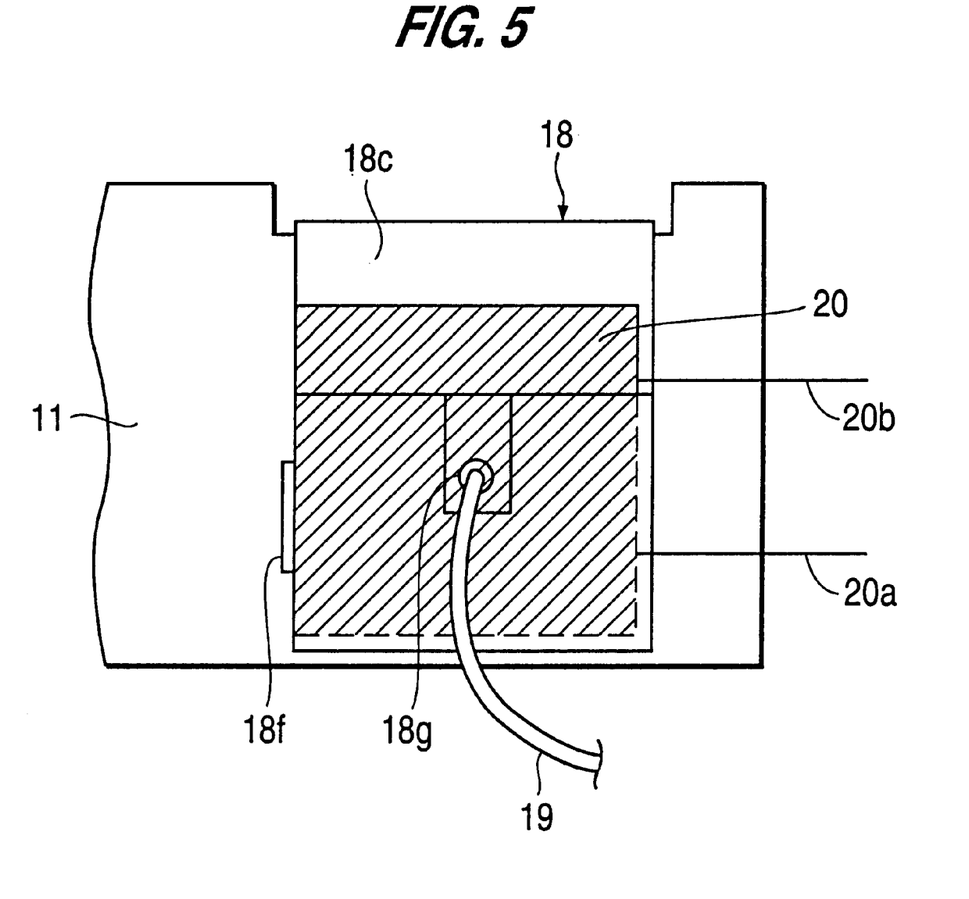
FIG. 5 is a front view of the power supply unit depicted in FIG. 2.

Referring now to FIG. 5, depicted therein is a front view of the power supply unit depicted in FIG. 2 and, in particular, a front view of battery contact/bracket 18. Specifically, thermal cutoff device 20 is mounted in holder section 18b such that stop member 18f abuts an outer edge of thermal cutoff device 20 to prevent the same from moving through or falling out of holder section 18b. A contact lead or wire 19 is shown as being coupled or connected to output terminal 18g. The leads 20a and 20b from thermal cutoff device 20 extend therefrom to connect to other components as described above in regard to FIG. 4 and which are described in regard to FIG. 11.

The structural features and characteristics described above are not intended to limit the present invention in any way. To the contrary, many changes may be made to support and mount thermal cutoff devices of different shapes, sizes and operational parameters. Exemplary alternative embodiments are now described with reference to FIGS. 6–10.

Figure 6:
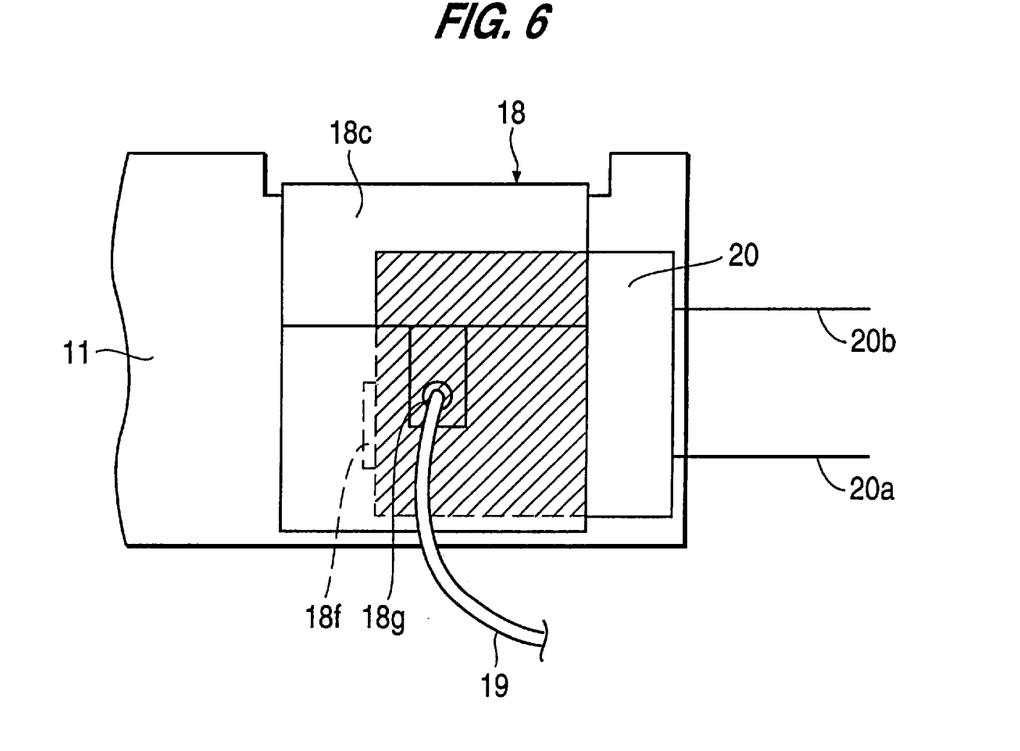
FIG. 6 is a front view of a battery contact/bracket according to another preferred embodiment of the present invention.

Referring now to FIG. 6, depicted therein is a front view of a battery contact/bracket according to another preferred embodiment of the present invention. Here, battery contact/bracket 18 has the same structural features as those illustrated in FIGS. 2–5, with the exception that such structures are in relatively different positions. In particular, stop member 18f is disposed in a middle region of connecting piece 18e. As such, the amount of surface area of battery contact/bracket 18 that is in contact with thermal cutoff device 20 is less than in the arrangement shown in FIG. 3. Accordingly, the operational parameters and, in particular, the heat transfer characteristics of battery contact/bracket 18 to thermal cutoff device 20, will differ from those illustrated in FIG. 3. Thus, the time until thermal cutoff device 20 cuts off or stops a current flow from a battery source, for example, is longer than in the case of the arrangement illustrated in FIG. 3.

When incorporating a battery contact/bracket like member 18 (as shown in FIG. 6) into a camera flash device (as described in regard to FIG. 11—discussed below), for example, certain components may become relatively hot as a result their operational parameters. As such, it is preferable to decrease the sensitivity of a thermal cutoff device. In the case of the present invention, such sensitivity can be decreased by simply adjusting the structural aspects of battery contact/bracket 18 (e.g., by having a differently disposed stop member 18f) and, in particular, adjusting the amount of surface area of holder section 18b that is allowed to come into contact with thermal cutoff device 20.

Figure 7:
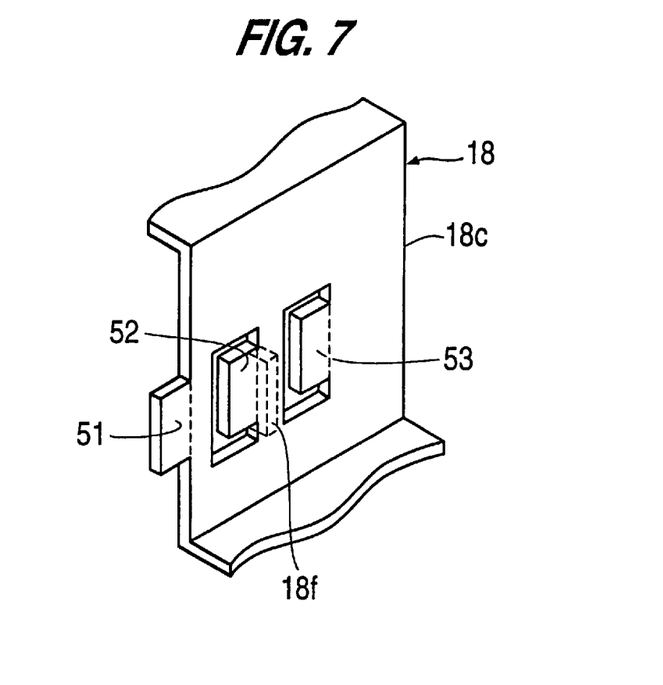
FIG. 7 is an oblique view of a battery contact/bracket according to another preferred embodiment of the present invention.

Referring now to FIG. 7, depicted therein is an oblique view of a battery contact/bracket according to another preferred embodiment of the present invention. In particular, to further alter the operational characteristics (e.g., cutoff time, etc.) of a thermal cutoff device, battery contact/bracket 18 includes one or more position adjustment flange units 51–53 (like stop member 18f—FIG. 3) which are disposed at intervals along connecting piece 18c. By simply bending adjustment flange unit 52, for example, as shown by the dotted lines, a battery contact/bracket like the one shown in FIG. 6 is realized. Alternatively, bending adjustment flange units 51 or 52 will allow different operational parameters based on the amount of surface area that is allowed to come into contact with a thermal cutoff device. It should be understood that when adjustment flange unit 51 is bent like adjustment flange unit 52, it will act like stop member 18f as shown in FIG. 3. And, it should also be appreciated that even after battery contact/bracket 18 has been formed and manufactured, it is possible to easily adjust the thermal response of a thermal cutoff device through simple bending of adjustment flange units to effect the amount of surface area of holder section 18b that is allowed to be in contact with a thermal cutoff device. The particular operational parameters that are desired will dictate the particular design characteristics and, in particular, the placement and arrangement of adjustment flange units.

Figure 8:
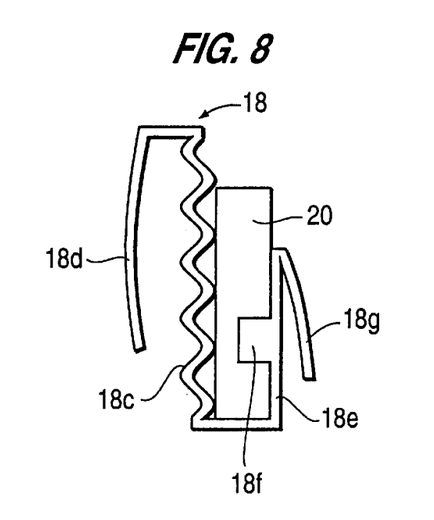
FIG. 8 is a side view of a battery contact/bracket according to another preferred embodiment of the present invention.

Referring now to FIG. 8, depicted therein is a side view of a battery contact/bracket according to another preferred embodiment of the present invention. Here, the surface of connecting piece 18c of battery contact/bracket 18 is formed to have corrugations or ripple structures. Accordingly, a thermal cutoff device that is mounted and housed in battery contact/cut bracket 18 will come into contact with only the crests of the corrugations formed on the surface of connecting piece 18c. Accordingly, the surface area of battery contact/bracket 18 allowed to come into contact with a thermal cutoff device will be less than in the arrangement shown in FIG. 3. Consequently, heat transmission to thermal cutoff device 20 will be delayed. The nature and design of a rippled or corrugated surface (e.g., like that of connecting piece 18c) to effect differences in contacting surface area contact will depend based on particular operational parameters that are required.

Figure 9:
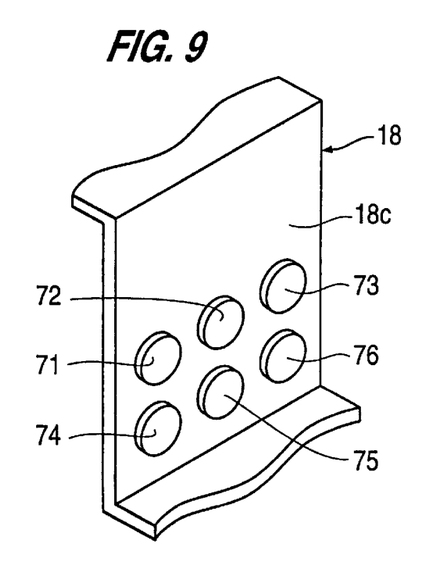
FIG. 9 is an oblique view of a battery contact/bracket according to another preferred embodiment of the present invention.

Referring now to FIG. 9, depicted therein is a side view of a battery contact/bracket according to another preferred embodiment of the present invention. Here, projections 71–76 are disposed on the surface of connecting piece 18c of battery contact/bracket 18. Accordingly, a thermal cutoff device that is mounted and housed in battery contact/bracket 18 will come into contact with only the surfaces of projections 71–76. Consequently, heat transmission to thermal cutoff device 20 will delayed. It should be understood that the sensitivity of a thermal cutoff device can be changed by altering the number, size, shape, and/or arrangement of the projections which are to be disposed on the surface of connecting piece 18c. Such projections may be formed via punch-press operation and the like.

Figure 10:
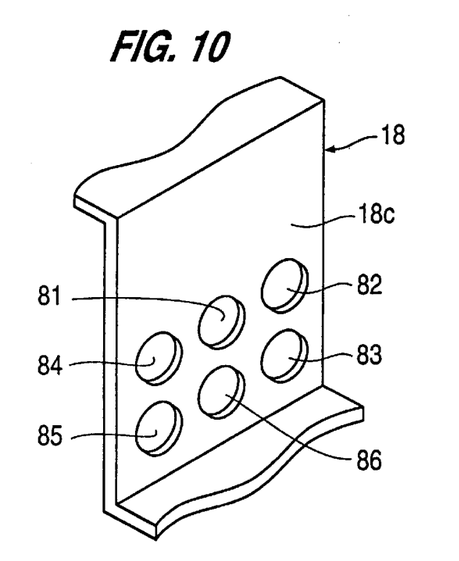
FIG. 10 is an oblique view of a battery contact/bracket according to another preferred embodiment of the present invention.

Referring now to FIG. 10, depicted therein is a side view of a battery contact/bracket according to another preferred embodiment of the present invention. Here, apertures or holes 81–86 are disposed in connecting piece 18c of battery contact/bracket. Accordingly, a thermal cutoff device that is mounted and housed in battery contact/bracket 18 will come into contact only with the solid surface of connecting piece 18c. Consequently, heat transmission to thermal cutoff device 20 will be delayed. It should be understood that the sensitivity of a thermal cutoff device can be changed by altering the number, shape, arrangement, and/or size of the apertures which are to be disposed in connecting piece 18c. Such apertures may be formed via punch-press operation and the like.

The alternative embodiments illustrated in FIGS. 7–10 are designed and fabricated (without needing special tools and the like) to adjust the thermal responsiveness of thermal cutoff devices which are mounted in corresponding holder portions of battery contact/bracket member. Furthermore, in the case that such battery contact/brackets are made of phosphor bronze, such material has the advantage over stainless steel, for example, in that phosphor bronze has a low electrical resistance. Unfortunately, however, the spring force of phosphor bronze is weak relative to stainless steel. Additionally, phosphor bronze is easily affected by strong alkali which may leak from a battery. Accordingly, stainless steel may be desired depending the application into which a battery contact/bracket according to the present invention is to be used. For example, in the case of portable electronic equipment, because short breaks of connection (short circuits, etc.) can arise due to vibration and the like, a material having a strong spring force is desirable.

Furthermore, although the battery contact/bracket embodiments described above have been located on the positive side of a power source, there is no such requirement. It is certainly feasible to locate a battery contact/bracket according to the present invention on a negative side of a power source.

The embodiments of a battery contact/bracket described above possess certain characteristics that will enable them to be viable devices. For example, because battery contact/brackets according to the present invention are manufactured according to uniform design parameters, and because no adhesives of varying thickness' are used to mount thermal cutoff devices within pieces of electronic equipment, uniform and expected thermal cutoff properties can be realized. Moreover, when replacing or exchanging a thermal cutoff device, a previous thermal cutoff device may simply be pulled out from a holder portion of a battery contact/bracket through simple and efficient manual operation. There is no need to melt adhesives, clean components, etc. Accordingly, the amount of work necessary to insert new or replace broken thermal cutoff devices is reduced. Finally, by allowing heat detection and thermal cutoff functionality to occur at a power source instead of at multiple points within a circuit, thermal cutoff functionality can be consolidated and reliably performed for electrical systems generally. Such consolidation of thermal cutoff functionality will result in fewer electronic components which, in turn, will result in greater design and manufacturing economies.

Operational Aspects of the Present Invention

To describe the operational aspects of a battery contact/bracket which has been provided in accordance with the present invention, the same has been placed into operation within an electronic camera flash unit that can be used with a camera. Such an application of the present invention is merely exemplary. Many other pieces of electronic equipment may incorporate a battery contact/bracket according to the present invention.

Accordingly, a flash unit which may be incorporated into a camera or one that is manufactured as a camera peripheral device is now described to illustrate how a battery contact/bracket according to the present invention will operate.

Referring now to FIG. 11, depicted therein is a circuit diagram of an electronic camera flash unit which includes a battery contact/bracket according to the present invention. The circuit portion 41 (circuit 41) of the flash unit is well known in the art of flash device technologies. As such, terminal 20b of thermal cutoff device 20 is connected to a positive terminal 42 of circuit 41. Accordingly, thermal cutoff device 20 is interposed between the positive terminal of the power supply (e.g., batteries in battery compartment 11) and circuit 41. The voltage input terminal of the power supply is a metal battery fitting 44 which comes into contact with a negative electrode of battery 43, and which also comes into contact with a negative terminal 45 of circuit 41.

The connection point of negative terminal 45 forms a ground line 47. A smoothing power supply capacitor C1 is connected in series between positive terminal 42 and negative terminal 45. Circuit 41 includes a typical step-up circuit, a voltage detection circuit, a main capacitor C4, a trigger circuit, and a light emitting tube Xe which are connected to each other in conventional ways and which are further described below. These circuits and the like are controlled by means of a control circuit 46 which will be readily understood by those skilled in the art.

The step-up circuit includes a step-up transistor Q1, a control transistor Q2, resistors R1–R4, diodes D1, D2, a capacitor C2, and a step-up transformer T1 having windings L1–L3. The voltage detection circuit includes a capacitor C3, resistors R5, R6, and a diode D3. The trigger circuit includes resistors R7–R9, capacitors C5, C6, a thyristor SCR, and a trigger transformer T2.

Step-up transistor Q1 is disposed with its emitter connected to positive terminal 42, its collector connected to ground line 47, and its emitter and base being connected via resistor R1. The base of step-up transistor Q1 is connected to the collector of control transistor Q2. The emitter of control transistor Q2 is connected via a primary winding L2 of step-up transformer T1 and resistor R4 to ground line 47.

The base of control transistor Q2 is connected via resistor R2 to a control line A1 of control circuit 46. Resistor R3 is connected between the emitter and the base of control transistor Q2. A secondary winding L3 of step-up transformer T1 has one end connected to the emitter of control transistor Q2 and the other end connected to the anode of a diode D1. The capacitor C2 is connected between the two ends of the secondary winding L3.

The cathode of diode D1 is connected via a capacitor Q3 to ground line 47 and via two series-connected resistors R5, R6 to ground line 47. The junction of the resistors R5 and R6 is connected to control line A2 of control circuit 46. Moreover, the anode of diode D3 is connected to the cathode of diode D1. Main capacitor C4 which stores light emission energy, and light emitting tube Xe, are connected between the anode of diode D3 and ground line 47.

The cathode of diode D3 is connected via a resistor R7 to the anode of thyristor SCR. The cathode of thyristor SCR is connected to ground line 47. The gate of thyristor SCR is connected to ground line 47 via a resistor R8 in parallel with a capacitor C5, and, in addition, is connected via a resistor R9 to control line A3 of control circuit 46.

The junction of resistor R7 and the anode of thyristor SCR is connected via capacitor C6 to one end of a primary winding L4 of transformer T2. The other end of primary winding L4, together with one end of a secondary winding L5 of transformer T2, is connected to ground line 47. The other end of secondary winding L5 is connected to a trigger electrode of the light emitting tube Xe.

The operation of the present invention in the context of an electronic camera flash unit is now described. When the power supply switch (not shown) of the electronic camera flash unit is closed, control circuit 46 applies a signal to control line A1 (e.g., line A1 is caused to go high). Consequently, a well known step-up operation is commenced by the step-up circuit, and light emission energy is stored in main capacitor C4. Such operation will be readily understood by those skilled in the art.

Control circuit 46 monitors, via control line A2, the voltage value to which the main capacitor C4 is charged. When main capacitor C4 is charged to a predetermined voltage value, and is in a fully charged state, control circuit 46 sets the signal of the control line A1 to a low level. Consequently, the step-up action of the step-up circuit ends.

Typically, control circuit 46 lights a Ready light (not shown) of a camera or a of a camera flash unit, letting a camera user know that the electronic flash device is capable of emitting a flash of light for a picture taking operation (e.g., for a photographic operation, a digital imaging operation, etc.). By depressing a camera shutter button (or image capture button in the case of a digital camera), control circuit 46 sets the signal applied to control line A3 to a high level. Consequently, the trigger circuit commences operation, and because the light emitting tube Xe emits light, photography/imaging can be performed using a flash of light.

Unfortunately, flash operations don't always occur as normally expected. For example, due to camera and flash unit movement and the like, electronic components can undergo stress and movement causing short circuits, etc. to occur. For example, when power supply capacitor C1 is short circuited due to shock or movement, the battery of the electronic flash unit can become short circuited. In such a case, a large current can flow in the flash unit. In a case in which an AA (double A) size alkaline manganese battery is used as the power supply, the short circuit current which can flow can approach 15–20 amperes. In the case that a nickel cadmium battery is used, a short circuit current of about 20–30 amperes can flow.

Accordingly, when a short circuit situation as described occurs, a battery can be caused to reach a relatively high temperature in a very short period of time. Because the electronic camera flash unit incorporates a battery contact/bracket like battery contact/bracket 18 (e.g., as shown in FIG. 3), such an anomalous temperature rise by a battery is transmitted to holder section 18b thereof via integrally formed contact piece 18d and connecting piece 18c. In turn, the heat emitted by a battery undergoing a short circuit is transmitted to a thermal cutoff device 20 maintained and held within the battery contact/bracket. Accordingly, the application of voltage to circuit 41 is cut off so that the electronic camera flash device can avoid the risks associated with overheating such as fire and the like.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A bracket for mounting a thermal cutoff device within an electronic device having an electronic component, comprising:
- a fastener fastening said bracket within said piece of electronic equipment; and
- a holder integrally formed with said fastener, said holder configured to releasably hold a thermal cutoff device, said thermal cutoff device configured to operate based on heat generated by said electronic component, said heat being transmitted to said thermal cutoff device via said fastener and said holder.

2. The bracket according to claim 1, further comprising:
an adjustment device integrally formed with said holder and adjusting the position of said thermal cutoff device within said holder.

3. The bracket according to claim 2, wherein said adjustment device is a projection disposed upon said holder, said projection fixing the position of said thermal cutoff device within said holder.

4. The bracket according to claim 1, wherein said holder further comprises a wall adjacent to said thermal cutoff device, said wall including an aperture.

5. The bracket according to claim 1, wherein said holder further comprises a wall adjacent to said thermal cutoff device, said wall including a projection, said projection contacting said thermal cutoff device when said thermal cutoff device is held in said holder.

6. The bracket according to claim 1, wherein said holder further comprises a rippled wall adjacent to said thermal cutoff device, said rippled wall including a plurality of projections, said plurality of projections contacting said thermal cutoff device when said thermal cutoff device is held in said holder.

7. The bracket according to claim 1, wherein said holder further comprises a wall adjacent to said thermal cutoff device, said wall including a plurality of adjusters, each adjuster of said plurality of adjusters capable of fixing the position of said thermal cutoff device within said holder.

8. The bracket according to claim 1, wherein said holder further comprises a wall adjacent to said thermal cutoff device, said wall including a plurality of position adjustment flanges for adjusting the position of said thermal cutoff device within said holder.

9. A bracket for mounting a thermal cutoff device within an electronic device having a battery compartment for maintaining a battery, comprising:
- a fastener fastening said bracket to said battery compartment; and
- a holder integrally formed with said fastener, said holder configured to releasably hold a thermal cutoff device, said thermal cutoff device configured to operate based on heat generated by said battery, said heat being transmitted to said thermal cutoff device via said fastener and said holder.

10. The bracket according to claim 9, further comprising:
an adjustment device integrally formed with said holder and adjusting the position of said thermal cutoff device within said holder.

11. The bracket according to claim 10, wherein said adjustment device is a projection disposed upon said holder, said projection fixing the position of said thermal cutoff device within said holder.

12. The bracket according to claim 9, wherein said holder further comprises a wall adjacent to said thermal cutoff device, said wall including an aperture.

13. The bracket according to claim 9, wherein said holder further comprises a wall adjacent to said thermal cutoff device, said wall including a projection, said projection contacting said thermal cutoff device when said thermal cutoff device is held in said holder.

14. The bracket according to claim 9, wherein said holder further comprises a corrugated wall adjacent to said thermal cutoff device, said corrugated wall including a plurality of corrugations, said plurality of corrugations contacting said thermal cutoff device when said thermal cutoff device is held in said holder.

15. The bracket according to claim 9, wherein said holder further comprises a wall adjacent to said thermal cutoff device, said wall including a plurality of adjusters, each adjuster of said plurality of adjusters capable of fixing the position of said thermal cutoff device within said holder.

16. The bracket according to claim 9, wherein said holder further comprises a wall adjacent to said thermal cutoff device, said wall including a plurality of position adjustment flanges for adjusting and fixing the position of said thermal cutoff device within said holder.

17. An electronic camera flash device, comprising:
- a flash system for providing flash illumination;
- a battery compartment for maintaining a battery; and
- a battery contact member for electrically coupling said battery to said flash system, said battery contact member including a fastener for fastening said battery contact member to said battery compartment, and a holder integrally formed with said fastener, said holder configured to releasably hold a thermal cutoff device, said thermal cutoff device configured to operate based on heat generated by said battery as a result of the operation of said flash system, said heat being transmitted to said thermal cutoff device via said fastener and said holder.

18. The electronic camera flash device according to claim 17, further comprising:
an adjustment device integrally formed with said holder and adjusting the position of said thermal cutoff device within said holder.

19. The electronic camera flash device according to claim 18, wherein said adjustment device is a projection disposed upon said holder, said projection fixing the position of said thermal cutoff device within said holder.

20. The electronic camera flash device according to claim 17, wherein said holder further comprises a wall adjacent to said thermal cutoff device, said wall including an aperture.

21. The electronic camera flash device according to claim 17, wherein said holder further comprises a wall adjacent to said thermal cutoff device, said wall including a projection, said projection contacting said thermal cutoff device when said thermal cutoff device is held in said holder.

22. The electronic camera flash device according to claim 17, wherein said holder further comprises a corrugated wall adjacent to said thermal cutoff device, said corrugated wall including a plurality of corrugations, said plurality of corrugations contacting said thermal cutoff device when said thermal cutoff device is held in said holder.

23. The electronic camera flash device according to claim 17, wherein said holder further comprises a wall adjacent to said thermal cutoff device, said wall including a plurality of adjusters, each adjuster of said plurality of adjusters capable of fixing the position of said thermal cutoff device within said holder.

24. The electronic camera flash device according to claim 17, wherein said holder further comprises a wall adjacent to said thermal cutoff device, said wall including a plurality of position adjustment flanges for adjusting and fixing the position of said thermal cutoff device within said holder.

25. A camera, comprising:
a flash unit for providing flash illumination;

a battery compartment for maintaining a battery; and a battery contact member for electrically coupling said battery to said flash system, said battery contact member including a fastener for fastening said battery contact member to said battery compartment, and a holder integrally formed with said fastener, said holder configured to releasably hold a thermal cutoff device, said thermal cutoff device configured to operate based on heat generated by said battery as a result of the operation of said flash system, said heat being transmitted to said thermal cutoff device via said fastener and said holder.

26. The camera according to claim 25, further comprising:

an adjustment device integrally formed with said holder and adjusting the position of said thermal cutoff device within said holder.

27. The camera according to claim 26, wherein said adjustment device is a projection disposed upon said holder, said projection fixing the position of said thermal cutoff device within said holder.

28. The camera according to claim 25, wherein said holder further comprises a wall adjacent to said thermal cutoff device, said wall including an aperture.

29. The camera according to claim 25, wherein said holder further comprises a wall adjacent to said thermal cutoff device, said wall including a projection, said projection contacting said thermal cutoff device when said thermal cutoff device is held in said holder.

30. The camera according to claim 25, wherein said holder further comprises a corrugated wall adjacent to said thermal cutoff device, said corrugated wall including a plurality of corrugations, said plurality of corrugations contacting said thermal cutoff device when said thermal cutoff device is held in said holder.

31. The camera according to claim 25, wherein said holder further comprises a wall adjacent to said thermal cutoff device, said wall including a plurality of adjusters, each adjuster of said plurality of adjusters capable of fixing the position of said thermal cutoff device within said holder.

32. The camera according to claim 25, wherein said holder further comprises a wall adjacent to said thermal cutoff device, said wall including a plurality of position adjustment flanges for adjusting and fixing the position of said thermal cutoff device within said holder.

* * * * *